United States Patent [19]

Aniano

[11] Patent Number: 5,317,575

[45] Date of Patent: May 31, 1994

[54] SYSTEM FOR DETERMINING BIREFRINGENT AXES IN POLARIZATION-MAINTAINING OPTICAL FIBER

[75] Inventor: John B. Aniano, High Bridge, N.J.

[73] Assignee: AlliedSignal Inc., Morris Township, Morris County, N.J.

[21] Appl. No.: 989,448

[22] Filed: Dec. 11, 1992

[51] Int. Cl.⁵ .................................................. H01S 3/30
[52] U.S. Cl. .......................................... 372/6; 372/105; 372/27
[58] Field of Search ..................... 372/6, 69, 70, 105, 372/27

[56] References Cited

U.S. PATENT DOCUMENTS

| | | | |
|---|---|---|---|
| 4,730,886 | 3/1988 | Hicks | 372/6 |
| 4,860,295 | 8/1989 | Byer et al. | 372/70 |
| 4,886,333 | 12/1989 | Hicks | 372/6 |
| 5,117,436 | 5/1992 | Hanson | 372/70 |

Primary Examiner—Léon Scott, Jr.
Attorney, Agent, or Firm—Donald B. Paschburg; Howard G. Massung

[57] ABSTRACT

To determine the angular orientation of polarization axes within a length of polarization-maintaining optical fiber, a coherent light source, such as a laser, is focused onto the side of the polarization-maintaining optical fiber and a resultant scattered pattern is generated. A sensor/analyzer monitors the resultant scattered pattern and determines the location of the polarization axes.

5 Claims, 2 Drawing Sheets

SYSTEM FOR DETERMINING BIREFRINGENT AXES IN POLARIZATION-MAINTAINING OPTICAL FIBER

BACKGROUND OF THE INVENTION

1. Field of the Invention

The present invention relates to polarization-maintaining optical fiber and more particularly to determining the angular orientation of the polarization axes within a length of such fiber.

2. Description of the Prior Art

Polarization-maintaining (PM) optical fiber generally has some physical provision for maintaining the state of linearly polarized light traveling through a single-mode core (Noda, J., Okamoto, K. and Sasaki, Y., "Polarization Maintaining Fibers and Their Applications", J. Lightwave Technology, LT.4, No. 8, pg. 1071, 1986). In most instances, this involves either the use of an elliptical core geometry or application of preferentially oriented compressive or tensile stresses surrounding a circular optical core (see FIGS. 1-4). The latter fibers have some form of stress-applying parts (SAPs) made of a glass having different thermal expansion properties than the surrounding fiber's glass matrix. By observing a cleaved or polished fiber endface under high magnification, one can readily discern the angular orientation of either the geometric core or SAP-style fibers, and hence the orientation of the principle polarization axes. Direct observation of PM fiber ends is, however, not always possible. Procedures including PM fiber splicing often require angular alignment while the fiber ends are butted together or otherwise visually inaccessible. A new means for determining the angular orientation of these polarization axes within a length of such fiber without examination of prepared endfaces is required.

The prior art of probing the orientation of polarization axes in PM optical fiber fall into only two categories known. The first consists of applying a compressive stress to the side of a PM fiber and observing a change in the fiber's polarization crosstalk or extinction ratio (Carrara, S. L. A., Kim, B. Y. and Shaw, H. J., "Elasto-optic alignment of birefringent axes in polarization-holding optical fiber", Optics Letters, 11, pg. 470, 1986). The other method is the Profile Alignment System (PAS) developed by Fujikura (Fujikura Ltd. product bulletin #88112000 on the FSM-20 PM, pg 2, 1990). A collimated whitelight source is incident to the side of a PM fiber and the resulting refracted image through the fiber is sensed via a CCD video camera and processed to resolve the apparent position of the SAP's, thus locating the polarization axes. Although the PAS method is best suited to the circular SAP geometry of Fujikura PANDA fiber (see FIG. 3), it has shown to have some success in locating polarization axes in one other type of non. circular SAP fiber (shown in FIG. 2) manufactured by Corning. The invention described herein, besides being able to locate polarization axes in these two types of SAP-containing fibers, can also locate axes in PM fiber having elliptical core regions as well.

SUMMARY OF THE INVENTION

The present invention includes a system for determining the angular orientation of polarization axes within a length of polarization-maintaining optical fiber. The system includes a coherent light source (e.g. laser) capable of generating a beam which is focused onto the side of a polarization-maintaining optical fiber. A sensor/analyzer monitors the resultant scattered pattern and determines the location of the fast and slow polarization axes.

DETAILED DESCRIPTION OF THE INVENTION

Figure 1:
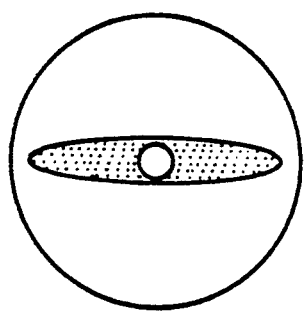
FIG. 1 illustrates a typical cross section of polarization maintaining fiber having an elliptical stress region.
Figure 2:
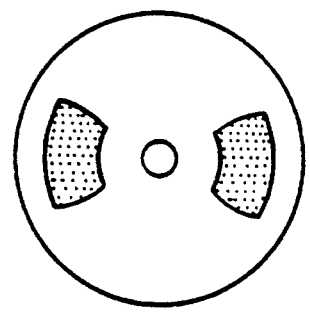
FIG. 2 illustrates a typical cross section of polarization maintaining fiber having bow-tie stress regions.
Figure 3:
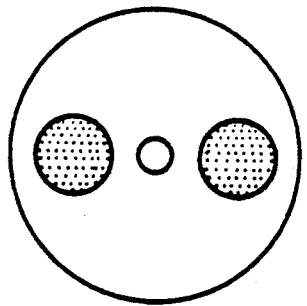
FIG. 3 illustrates a typical cross section of polarization maintaining fiber having circular stress regions (PANDA).
Figure 4:
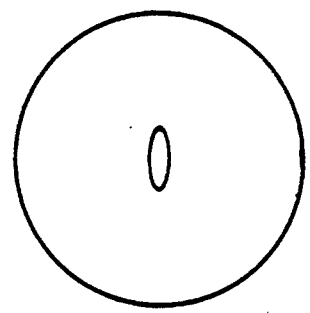
FIG. 4 illustrates a typical cross section of polarization maintaining fiber having elliptical core region.
Figure 5:
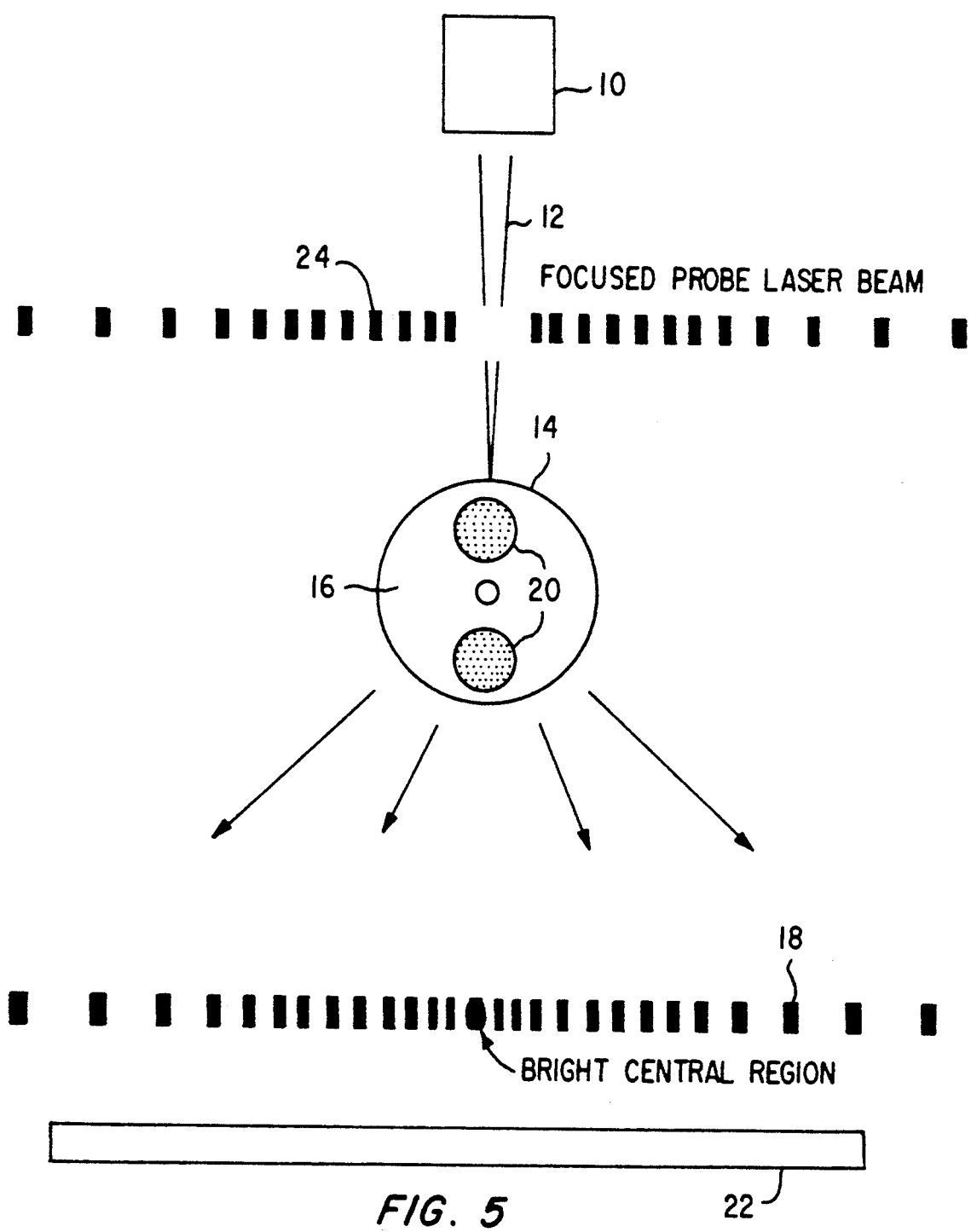
FIG. 5 illustrates one embodiment of the present invention.

As illustrated in FIG. 5, one embodiment of the invention, focused coherent light source 10, i.e., a laser, produces a beam 12 incident to the side 14 of a PM optical fiber 16. A scattered light pattern 18 results from the interaction of this high intensity "probe" light beam 12 with the various non-symmetrical glass elements 20 such as SAP's, elliptical core regions and the like, contained within the PM optical fiber 16. Scattered light pattern 18 is sensed and analyzed by sensor/analyzer 22. This scattered pattern varies in a characteristic and reproducible manner as the fiber is rotated, with the exact variation dependent upon the PM fiber geometry. This variation consists of light scattered into bright and dark regions that converge or diverge from a bright central location. Depending upon the fiber geometry, this converged or diverged pattern denotes the fiber's fast or slow polarization axis position with respect to the orientation of the focused probe laser beam. The pattern 18 is both forward scattered as well as backward scattered i.e. 24.

The practical importance of this invention primarily involves PM fiber splicing, pigtailing and coupler manufacture. When splicing PM fiber, one minimizes loss and maximizes polarization extinction ratio through the joining point. Attaining the latter requirement involves matching the orientation of the fast and slow polarization axes between the two fibers joined to within 1 degree. The invention described herein has been used in the laboratory to rapidly locate and match PM fiber polarization axes to better than 0.5 degrees during the process of fiber splicing. The present invention can greatly facilitate the joining of similar or dissimilar PM fiber since the polarization axes can be readily located regardless of the fibers' polarization-maintenance geometries. Additionally, the present invention may be the only reliable method known to adequately align dissimilar geometry PM fiber for splicing.

The pigtailing process, consisting of the optical and mechanical joining of PM fibers to optically active substrates, also relies on accurate angular alignment of the polarization axes between fiber and substrate. The present invention can and has been used to replace the high-power microscope observation method currently employed in the pigtailing process to join PM fibers to integrated-optic chips (IOCs).

The manufacture of couplers made from PM fiber requires precise angular alignment of the polarization axes within a length of PM fiber. Two sections of fiber are processed in such a way to accurately locate the core regions longitudinally to within a few microns. Ascertaining the polarization axes orientations within a length of PM fiber to more easily fabricate PM fiber couplers could be an additional application of the present invention.

It is not intended that this invention be limited to the hardware arrangement, or operational procedures shown disclosed. This invention includes all of the alterations and variations thereto as encompassed within the scope of the claims as follows.

I claim:

1. A method which determines the position of birefringent axes in a polarization maintaining optical fiber, comprising the steps of:

generating a beam from a coherent light source;

causing the beam to interact with non-symmetrical glass elements within an optical fiber, thereby scattering light in a pattern;

sensing the scattered light pattern; and analyzing the sensed scattered light pattern to determine the position of the birefringent axes of the optical fiber.

2. A method as described by claim 1, wherein the step of causing the beam to interact with non-symmetrical glass elements within an optical fiber for scattering light in a pattern includes the step of:

focusing the beam onto a side of the optical fiber.

3. A method as described by claim 2, including:

the step of the step of:

rotating the optical fiber for varying the scattered light pattern so as to have light and dark regions converging and diverging in a pattern from a bright central region, said converging and diverging pattern indicating the birefringement axes position of the fiber with respect to the focused beam.

4. A method as described by claim 3, wherein the step of analyzing the sensed scattered light pattern to determine the birefringent axes position of the optical fiber includes the step of:

monitoring the converging and diverging pattern.

5. A method as described by claim 1, wherein the step of generating a beam from a coherent light source includes the step of:

using a laser as the coherent light source.

* * * * *